United States Patent [19]
Laeuffer et al.

[11] Patent No.: US 6,215,675 B1
[45] Date of Patent: Apr. 10, 2001

(54) METHOD APPARATUS FOR ENERGY CONVERSION

(76) Inventors: Jacques Laeuffer, 5, rue Dufrenoy, 75016 Paris (FR); Thierry Planas, 73, Avenue Franklin Roosevelt, 94550 Chevilly Larue, Paris (FR)

(*) Notice: Subject to any disclaimer, the term of this patent is extended or adjusted under 35 U.S.C. 154(b) by 0 days.

(21) Appl. No.: 09/149,645

(22) Filed: Sep. 8, 1998

(30) Foreign Application Priority Data

Sep. 10, 1997 (FR) .................................. 97 11244

(51) Int. Cl.[7] .............................. H02M 3/335; H02M 7/44
(52) U.S. Cl. ................................................ 363/17; 363/98
(58) Field of Search .................................. 363/16, 17, 97, 363/98, 131, 132

(56) References Cited

U.S. PATENT DOCUMENTS

| 4,600,983 | * | 7/1986 | Petsch | 363/63 |
| 4,992,919 | | 2/1991 | Lee | 363/17 |
| 5,243,509 | * | 9/1993 | Laeuffer | 363/17 |
| 5,448,467 | * | 9/1995 | Ferriera | 363/17 |
| 5,592,368 | | 1/1997 | Bidaud et al. | 363/34 |
| 5,600,234 | | 2/1997 | Hastings et al. | 323/282 |
| 5,619,406 | * | 4/1997 | Divan et al. | 363/98 |

FOREIGN PATENT DOCUMENTS 0605330  7/1994 (EP).

* cited by examiner

Primary Examiner—Matthew Nguyen
(74) Attorney, Agent, or Firm—Jay L. Chaskin

(57) ABSTRACT

Method and apparatus for regulating a converter having transistors, in which the value of a number $N_1$ of state variables is measured and stored, then action is carried out on a number $N_2$ of control variables. $N_1$ being greater than $N_2$, the value of the control variables is calculated, at a given instant, for a number P of periods such that the product of $N_2$ multiplied by P is greater than or equal to $N_1$.

14 Claims, 8 Drawing Sheets

METHOD APPARATUS FOR ENERGY CONVERSION

BACKGROUND OF THE INVENTION

The present invention relates to the field of DC/AC conversion of electrical energy.

Inverters are supplied with a DC voltage and deliver as output an AC voltage by virtue of one or more transistor half-bridges. The output AC voltage is generally subjected to filtering.

Inverters of this type are, amongst other things, used for the electrical power supply of an X-ray tube.

An X-ray tube mounted, for example, in a medical radiology instrument, comprises a cathode and an anode which are both enclosed in an evacuated leaktight casing, so as to produce electrical insulation between these two electrodes. The cathode produces an electron beam which is received by the anode on a small surface constituting a focus from which the X-rays are emitted.

When a high supply voltage is applied using a generator to the terminals of the cathode and the anode, so that the cathode is at a negative potential −V and the anode is at a positive potential +V, with respect to the potential of the cathode, a so-called anodic current is set up in the circuit through the generator which produces the high supply voltage. The anodic current passes through the space between the cathode and the anode in the form of an electron beam which bombards the focus.

The anode is in the shape of a flat disc which is supported by a shaft, driven in rotation by a rotor of an electric motor, the stator of which is arranged outside the casing, with the aim of promoting the dissipation of the energy. The X-ray tube is arranged in an enclosure filled with an insulating refrigerant.

The characteristics of the X-rays which are emitted by the tube, in particular their hardness, depend on a number of parameters, including the value of the high voltage applied to the electrodes. This high voltage should be adjustable in order to obtain the desired characteristics, and should remain constant throughout the radiological exposure time, so as not to alter the operating characteristics of an X-ray receiver which receives the X-rays which have passed through the object which is undergoing examination.

X-rays tubes for medical diagnosis operate in pulses. It is therefore important for the time taken to establish the high voltage, as well as the time taken to return from this high voltage to a zero value, to be as short as possible.

A high-voltage generator for an X-ray tube generally comprises a supply circuit which delivers a DC voltage E starting with an AC voltage delivered by the mains. The voltage E is applied to the terminals of an inverter of the type which comprises at least one transistor half-bridge, each branch of the half-bridge comprising a switch S consisting of a transistor T and a freewheeling diode D mounted in antiparallel. The AC signal delivered by the inverter is applied, via a filter, to the primary of a step-up voltage transformer having a turns ratio k. The secondary of the step-up voltage transformer is connected to a rectifying and filtering circuit comprising at least one diode halfbridge and capacitors $C_f$ for filtering the voltage.

In known fashion, the inverter comprises a transistor pair connected in series to the output terminals of the supply circuit. A diode is connected between the collector and the emitter of each transistor T, so that its anode is connected to the emitter of the corresponding transistor. The bases of the transistors are connected to a control circuit which delivers switching signals for the transistors. In the case of a single half-bridge, the two output terminals of the inverter consist of the common point of the two branches of the half-bridge and of a point common to two capacitors of the half-bridge which are mounted in parallel and, in the case of two half-bridges, of each point common to the two transistors of a half-bridge.

The output filter of the inverter comprises, for example, a coil $L_r$ and a capacitor $C_r$ which are arranged in series, and a coil $L_p$ which is arranged in parallel with the capacitor $C_r$. One of the terminals of the filter is connected to an output terminal of the inverter, and the other terminal is connected to a terminal of the primary circuit of the transformer. A filter with single resonance may also be used.

The rectifying circuit connected to the secondary of the step-up voltage transformer consists, for example, of a two-diode bridge, the point common to the two diodes being connected to one of the output terminals of the secondary of the transformer, two capacitors $C_{f1}$ and $C_{f2}$ being arranged in parallel with the diode bridge, the other terminal of the secondary of the transformer being connected to the point common to the two capacitors $C_f$.

The control circuit essentially comprises a comparator, a circuit for measuring the current $I_{1r}$ at the primary of the transformer, and a circuit for developing the switching signals for the transistors of the inverter. One of the two output terminals of the comparator is connected to the common point of two resistors of a voltage divider, to which the DC supply voltage $V_{cf}$ of the X-ray tube is applied, and the other is connected to a reference voltage source. The output terminal of the comparator delivers a signal whose amplitude is proportional to the difference between the two voltages applied to the input terminals, and it is connected to an input terminal of the circuit for developing the switching signals, so as to bring about a change in the frequency of the control signals for the transistors. The output terminal of the circuit for measuring the current in the primary of the transformer is connected to another input terminal of the circuit for developing the switching signals, with the aim of detecting and avoiding certain malfunctions of the inverter.

In conventional fashion, the control variable on which the control circuit acts is the time period $T_d$ until the transistors are turned on, starting from the instant when the current of the inverter reaches a zero value.

The presence of a filter with double resonance makes it possible to have the current of the inverter change as a monotonically increasing function of frequency, between the parallel resonant frequency and the series resonant frequency, the values of which depend on the values of the capacitor $C_r$ of the series coil $L_r$ and of the parallel coil $L_p$ of the filter. It therefore seems possible to control the power transmitted to the X-ray tube by the operating frequency of the inverter, and consequently the activation delay $T_d$. A filter with single resonance also makes it possible to control the power by the activation delay $T_d$.

However, known control circuits do not make it possible to set the DC supply voltage $V_{cf}$ of the X-ray tube to its desired value until too much time has elapsed, which results in time being wasted and by a dose of X-rays being received superfluously by the patient. This is because the efficiency of the X-rays for taking exposures is proportional to the voltage $V_{cf}$ raised to the fifth power. The dose of X-rays received before the desired voltage $V_{cf}$ is established, cannot be used for taking exposures.

These control circuits leave some degree of ripple in the voltage $V_{cf}$ after it has been established. This ripple is at a frequency of 100 or 300 Hz, depending on the supply type used: single-phase or three-phase. These ripples are even more problematic since the number of exposures taken per second may be as many as thirty and since it leads to an instability in the images. For a scanner, which is provided with a rotary source so as to obtain three-dimensional information, the image computation presupposes that the images are stable and consequently that the voltage is constant.

SUMMARY OF THE INVENTION

It is therefore desirable to overcome the drawbacks mentioned above, by providing a method and a device for regulation which make it possible to reduce the time taken to establish the voltage $V_{cf}$ at the start of an exposure.

It is further desirable to reduce the ripple in the voltage $V_{cf}$ in steady state.

The method for regulating a converter having transistors, in an embodiment of the invention, comprises steps of measuring and storing the value of a number $N_1$ of state variables, then of acting on a number $N_2$ of control variables. $V_{cf}$ being greater than $N_2$, the value of the control variables is calculated, at a given instant, for a number P of periods such that the product of $N_2$ multiplied by P is greater than or equal to $N_1$. It is thus possible to act on all the state variables while retaining the possibility of establishing a hierarchy between them and of assigning priority to one or other of them.

In one embodiment of the invention, there is a single control variable, which is a time variable. In this case, a number P of periods equal to the number $N_1$ of state variables will generally be chosen, which leads to a system of $N_1$ equations with P unknowns, the P unknowns being the values of the time variable for each period.

In one embodiment of the invention, the regulation is of the proportional-integral type for one of the state variables and of the proportional type for the other state variables.

Advantageously, the state variables are measured each time one of the said state variables reaches a predetermined threshold value, for example a zero value.

In one embodiment of the invention, the state variables are the current $I_{1r}$ in a series filtering inductor, the current $I_{1p}$ in a parallel filtering inductor, the voltage $V_{cr}$ across the terminals of a filtering capacitor, and the output voltage $V_{cf}$ of the converter.

The device for regulating an energy conversion assembly, according to the invention, comprises means for discretely measuring the values of a number $N_1$ of state variables, and means for controlling a number $N_2$ of control variables, with the aim of obtaining, at the output of the control assembly, an optimum time variation of one or more of the state variables, it being possible for the variation of the energy conversion assembly over a period between two measuring instants to be estimated by knowing the state variables at the first measuring instant and the control variables during the period in question. The device comprises means for developing the values of the $N_1$ control variables over a number P of measuring instants, $N_1$ being greater than $N_2$, with P such that the product of $N_2$ multiplied by P is greater than or equal to $N_1$.

By virtue of the invention, a significant reduction, of the order of 60%, is obtained in the time taken to establish the voltage $V_{cf}$. A very great reduction is thus obtained in the dose received superfluously by the patient during the set-up time. This also improves the quality of the images obtained with the radiology device, by virtue of better stability of the voltage $V_{cf}$ in steady state.

Of course, the invention can be applied to various types of converters and makes it possible for their performance to be improved significantly.

BRIEF DESCRIPTION OF THE DRAWINGS

The invention will be understood more clearly, and other advantages will emerge, from the following detailed description of an embodiment, taken by way of entirely non-limiting example and illustrated by the appended drawings, in which.

DETAILED DESCRIPTION OF THE INVENTION

Figure 1:
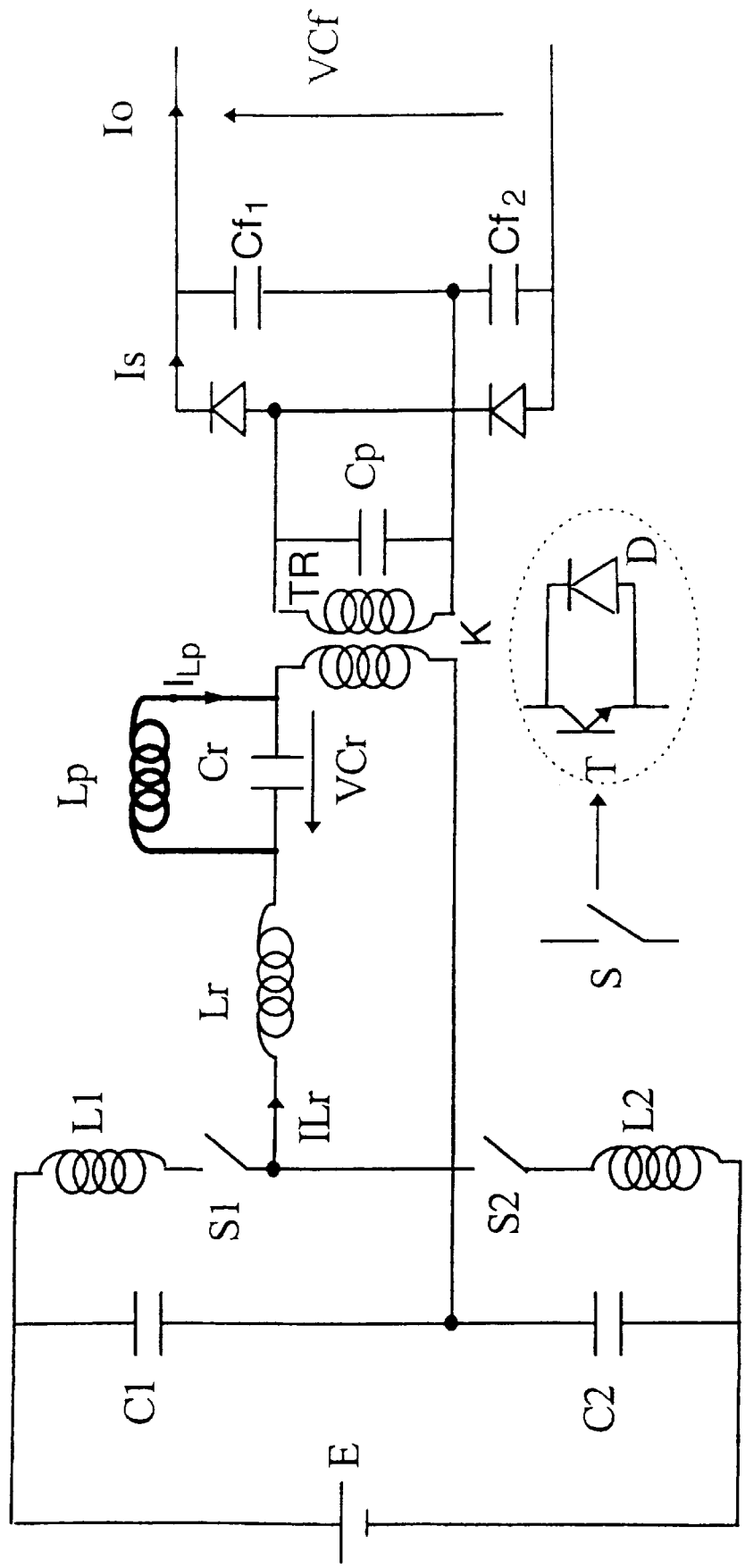
FIG. 1 is a schematic diagram of an energy conversion device.

In FIG. 1, a DC voltage source E supplies a half-bridge provided with two switches $S_1$ and $S_2$, each composed of a power transistor, for example of the insulated-gate bipolar transistor (IGBT) type, and of a freewheeling diode. The inductors $L_1$ and $L_2$ serve to assist switching. The capacitors $C_1$ and $C_2$ are mounted in series and filter the voltage E. The voltage E is delivered by the mains AC voltage which is rectified by means (not shown).

The center output of the half-bridge formed by the switches $S_1$ and $S_2$ is connected to one terminal of the primary of a transformer $T_R$, the other terminal being connected to the point common to the two filtering capacitors $C_1$ and $C_2$. A filter with double resonance is arranged between the point common to the two switches $S_1$ and $S_2$ and the transformer $T_R$. This filter comprises a series inductor $L_r$, a series capacitor $C_r$ and a parallel inductor $L_p$ which is mounted in parallel with the capacitor $C_r$. The transformer $T_R$ steps up the voltage by a coefficient K. This voltage is then rectified by a diode half-bridge and by two filtering capacitors $C_f$. Of course, a four-switch inverter and a four-diode rectifier could be used. The output voltage $V_{cf}$ of the rectifier is sent to an X-ray tube (not shown).

The value of the components of the filter is chosen so as to define a parallel resonant frequency $F_p$=20 kHz so as to be outside the audible spectrum, and a series resonant frequency $F_s$ which is greater than the parallel resonant frequency and is chosen in accordance with the frequency limitations imposed by the switching times of the transistors of the half-bridge of the inverter, for example 70 kHz. When the operating frequency, lying between the parallel resonant frequency $F_p$ and the series resonant frequency $F_s$, approaches the series resonant frequency $F_s$, the impedance of the filter decreases, which leads to an increase in the current and therefore in the power transmitted to the transformer. Conversely, when the operating frequency decreases and approaches the parallel resonant frequency $F_p$, the impedance of the filter increases and the output current $I_o$ tends towards a zero value. It is therefore possible to control the current $I_{1r}$ by the operating frequency.

However, the values of the inductors $L_r$ and $L_p$ and of the capacitor $C_r$ of the filter are only known to within 5%. Moreover, the resonant frequencies are determined by the values of these components. Control by means of the frequency is not very effective because of this inaccuracy. A different approach is therefore used, involving the difference between the operating frequency and the actual series resonant frequency. Specifically, when the operating frequency tends towards the series resonant frequency $F_s$, the conduction delay $T_d$ of the diodes of the switches tends towards zero. The zero crossing of the current $I_{1r}$ in the series inductor $L_r$ is detected, and a counter is triggered until the transistor of the opposite branch of the half-bridge is caused to switch on. It is thus possible to synchronize with the zero crossing of the current $I_{1r}$.

Figure 2:
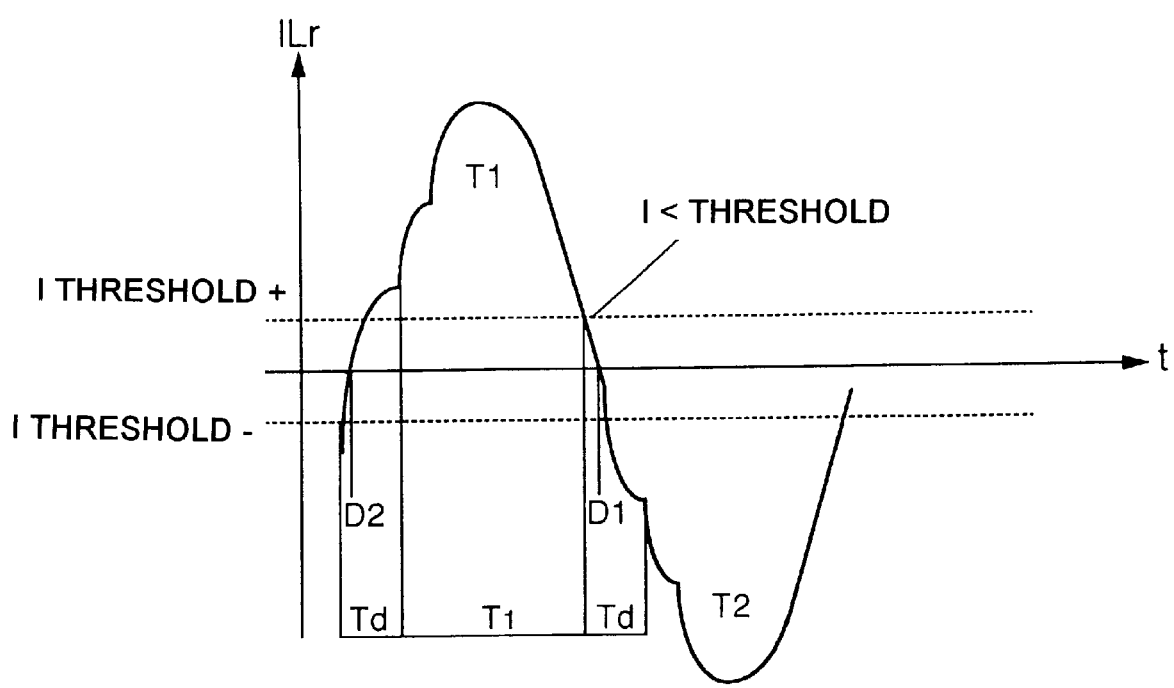
FIG. 2 is a time diagram showing the variation in the current $I_{1r}$ in the series inductor.
Figure 3:
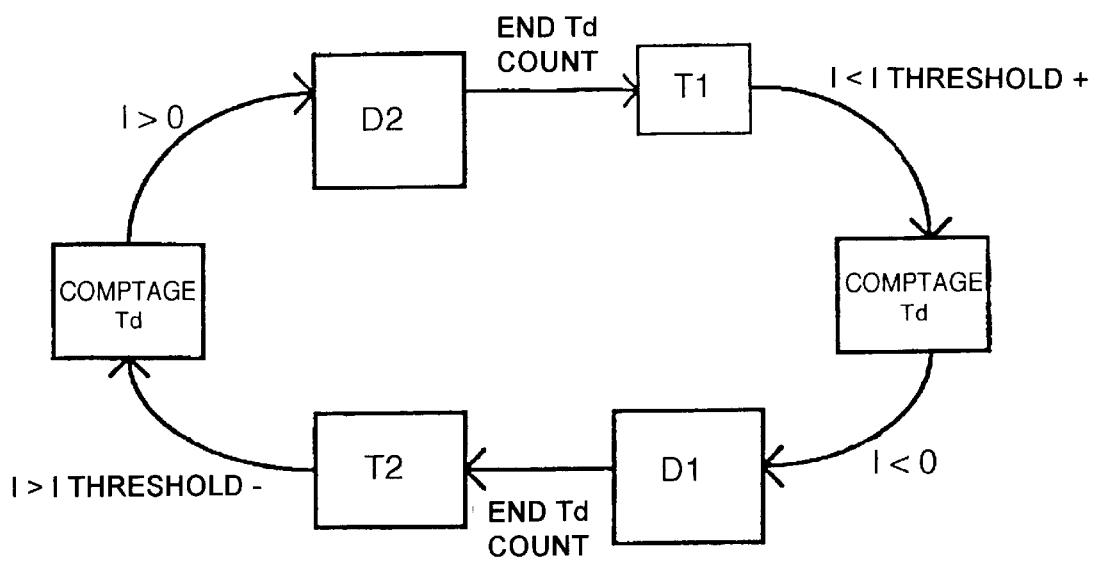
FIG. 3 shows the change in the status of the transistors and of the diodes of the converter over one half-cycle.

In FIGS. 2 and 3, small positive and negative threshold values of $I_{1r}$ are defined, on the basis of which the period $T_d$ after which the transistor is switched on is counted down.

When the current $I_{1r}$ at the end of a negative half-cycle becomes greater than the negative threshold value, the counting of the period $T_d$ is triggered. At the end of the period $T_d$ the current $I_{1r}$ has become positive and the switching-on of the transistor $T_1$ is triggered. Then, when the current $I_{1r}$ becomes less than the positive threshold, the counting of the period $T_d$ is again triggered. When the current $I_{1r}$ becomes negative, the diode $D_1$ becomes forward-biased. When the period $T_d$ has elapsed, the transistor $T_2$ is switched on.

Figure 4:
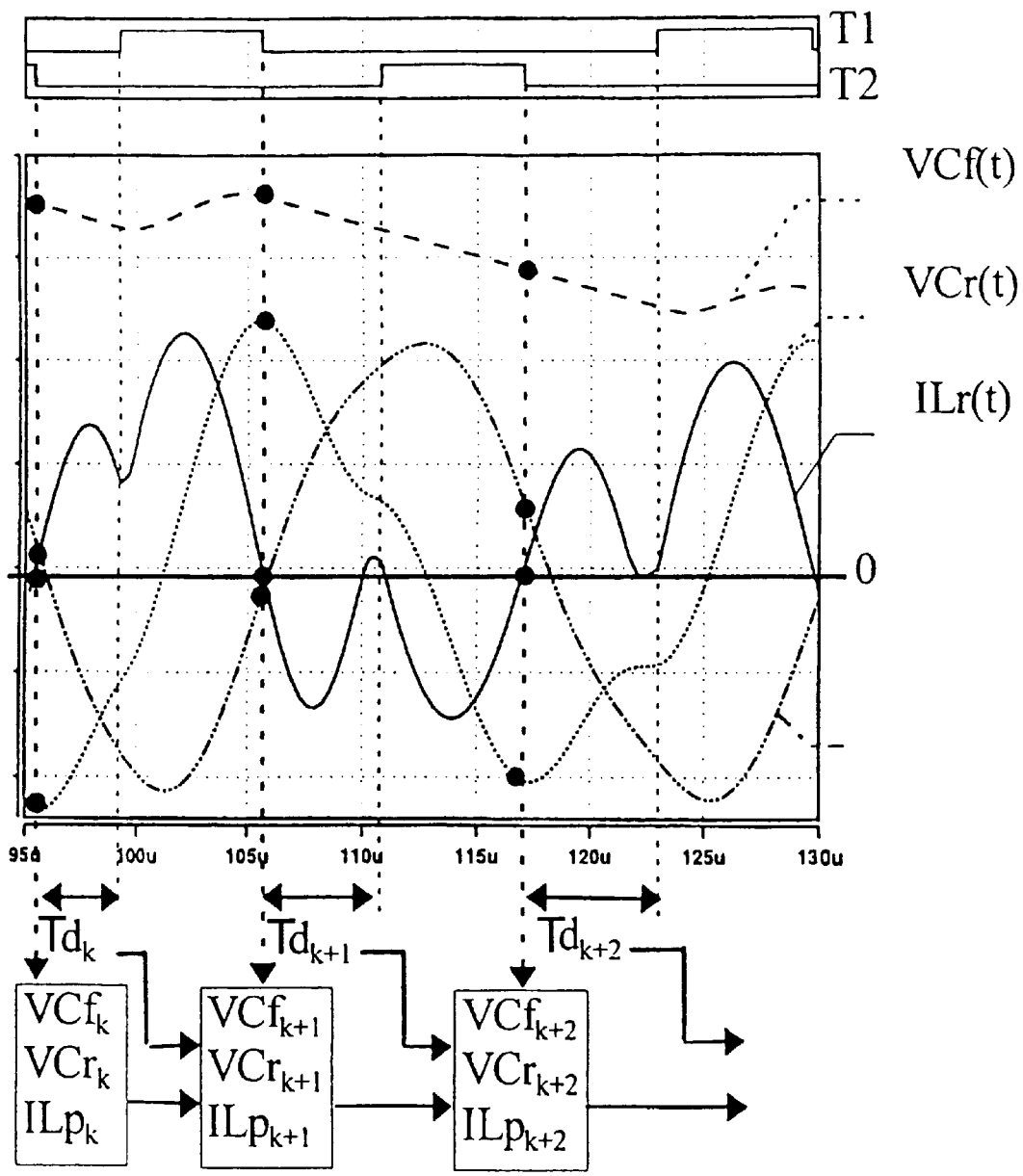
FIG. 4 shows the waveforms of the main variables during a transient.

As illustrated in FIG. 4, the sampling instants are chosen such that the current $I_{1r}$ is zero, and at this instant the value of the other state variables $V_{cf}$, $V_{cr}$ and $I_{1p}$ are measured, $V_{cr}$ being the voltage across the terminals of the series capacitor $C_r$, and $I_{1p}$ being the current in the parallel inductor $L_p$. These values are then stored in a memory. In view of the characteristics of the system, the waveform of the state variables between two sampling instants depends only on the value of the three aforementioned state variables $V_{cf}$, $V_{cr}$, $I_{1p}$ and on the value of the chosen activation delay $T_d$. On the basis of these data, it is possible to try to find the transfer function and carry out simulations over a half-cycle while remaining close to steady state.

The aim of the regulation of a converter for an X-ray tube is to obtain the output voltage $V_{cf}$ while maintaining correct operation of the converter. However, acting on the single control variable consisting of the activation delay $T_d$ over one half-cycle, only makes it possible to regulate one of the state variables, namely $V_{cf}$, which runs the risk of leading to undesired values of the voltage $V_{cr}$ and the current $I_{1p}$.

Regulation is therefore carried out over three half-cycles, and there are thus three available control variables $T_{dk}$, $T_{dk+1}$, $T_{dk+2}$, which makes it possible to provide as many control variables as there are state variables and to reach a stable state at the end of the third half-cycle. Since regulating the voltage $V_{cf}$ takes priority over regulating the voltage $V_{cr}$ and the current $I_{1p}$, provision is made to add an integral term to the regulation of $V_{cf}$, while the regulation of $V_{cr}$ and $I_{1p}$ is merely proportional.

In other words, in order to regulate suitably a system having a number of state variables greater than the number of control variables, this regulation is carried out over a number of half-cycles greater than 1, so that the product of the number of half-cycles multiplied by the number of control variables is greater than the number of state variables, in order to have a number of transfer equations equal to this product and therefore greater than the number of state variables. It is therefore possible to predict the future status of the regulating system with equations of the type $X(k+1)=A*X(k)+B*T_d$, in which X is the vector formed by the state variables. The values of the matrices A and B are determined close to a particular operating point in steady state.

Figure 5:
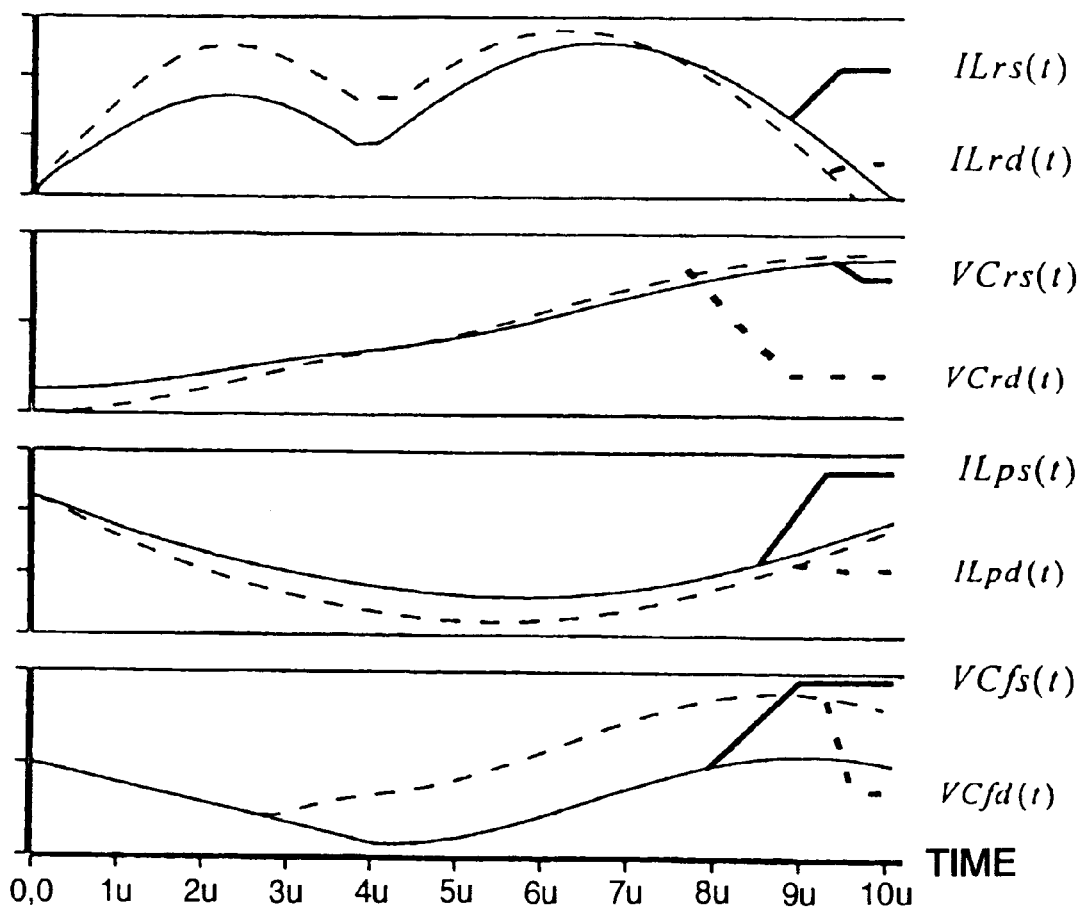
FIGS. 5 to 7 are time diagrams of the change in the state variables subsequent to a modification of $V_{cr}$, $I_{1p}$ and $T_d$.
Figure 6:
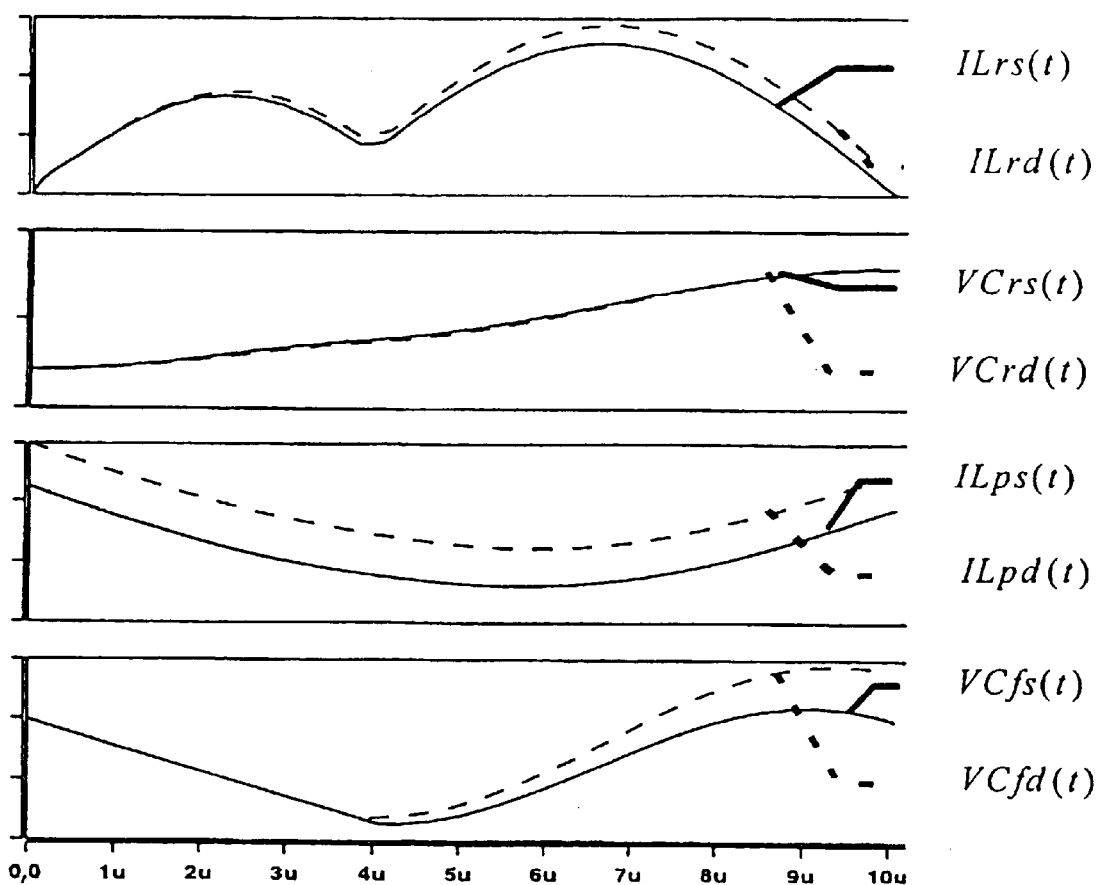
Figure 7:
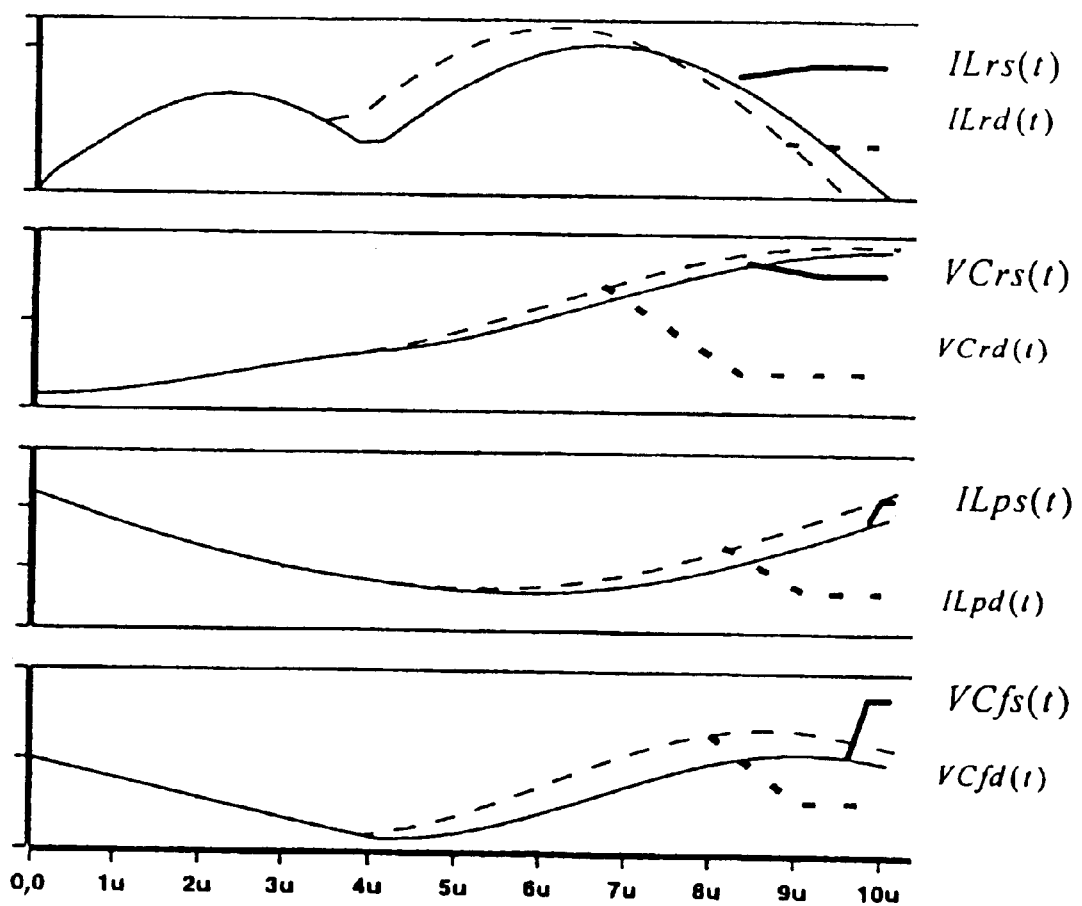

These constants may be calculated by simulating low-amplitude transients with respect to this operating point, $V_{cf}$ and $T_d$ being fixed. Simulations are successively carried out on the voltage $V_{cr}$ (FIG. 5) starting from the following initial conditions: $V_{crk}=V_{crs}+dV_{cr}$, $I_{1pk}=I_{1ps}$ and $V_{cfk}=V_{cfs}$, the values assigned an index S corresponding to the operating point in steady state. The same simulation is carried out on the current $I_{1p}$, starting from the following initial conditions: $V_{crk}=V_{crs}$, $I_{1pk}=I_{1ps}$ and $V_{cfk}=V_{cfs}$. The curves represented in FIG. 6 are obtained. A last simulation is carried out while keeping the state variables to their value of the operating point in steady state, and by modifying the value of the activation delay: $T_{dk}=T_{ds}+dT_d$.

By virtue of this simulation, the transfer function of the converter close to a stable state is obtained, this being written as follows:

$$\begin{pmatrix} VCr_{k+1} - VCrs \\ ILp_{k+1} - ILps \\ VCf_{k+1} - VCfs \end{pmatrix} =$$

$$\begin{pmatrix} \dfrac{\partial VCr_{k+1}}{\partial VCr_k} & \dfrac{\partial VCr_{k+1}}{\partial ILp_k} & 0 \\ \dfrac{\partial ILp_{k+1}}{\partial VCr_k} & \dfrac{\partial IL_{k+1}}{\partial ILp_k} & 0 \\ \dfrac{\partial VCf_{k+1}}{\partial VCr_k} & \dfrac{\partial VCf_{k+1}}{\partial ILp_k} & 1 \end{pmatrix} \cdot \begin{pmatrix} VCr_k - VCrs \\ ILp_k - ILps \\ VCf_k - VCfs \end{pmatrix} + \begin{pmatrix} \dfrac{\partial VCr_{k+1}}{\partial td_k} \\ \dfrac{\partial ILp_{k+1}}{\partial td_k} \\ \dfrac{\partial VCf_{k+1}}{\partial td_k} \end{pmatrix} \cdot (td_k - tds)$$

Figure 8:
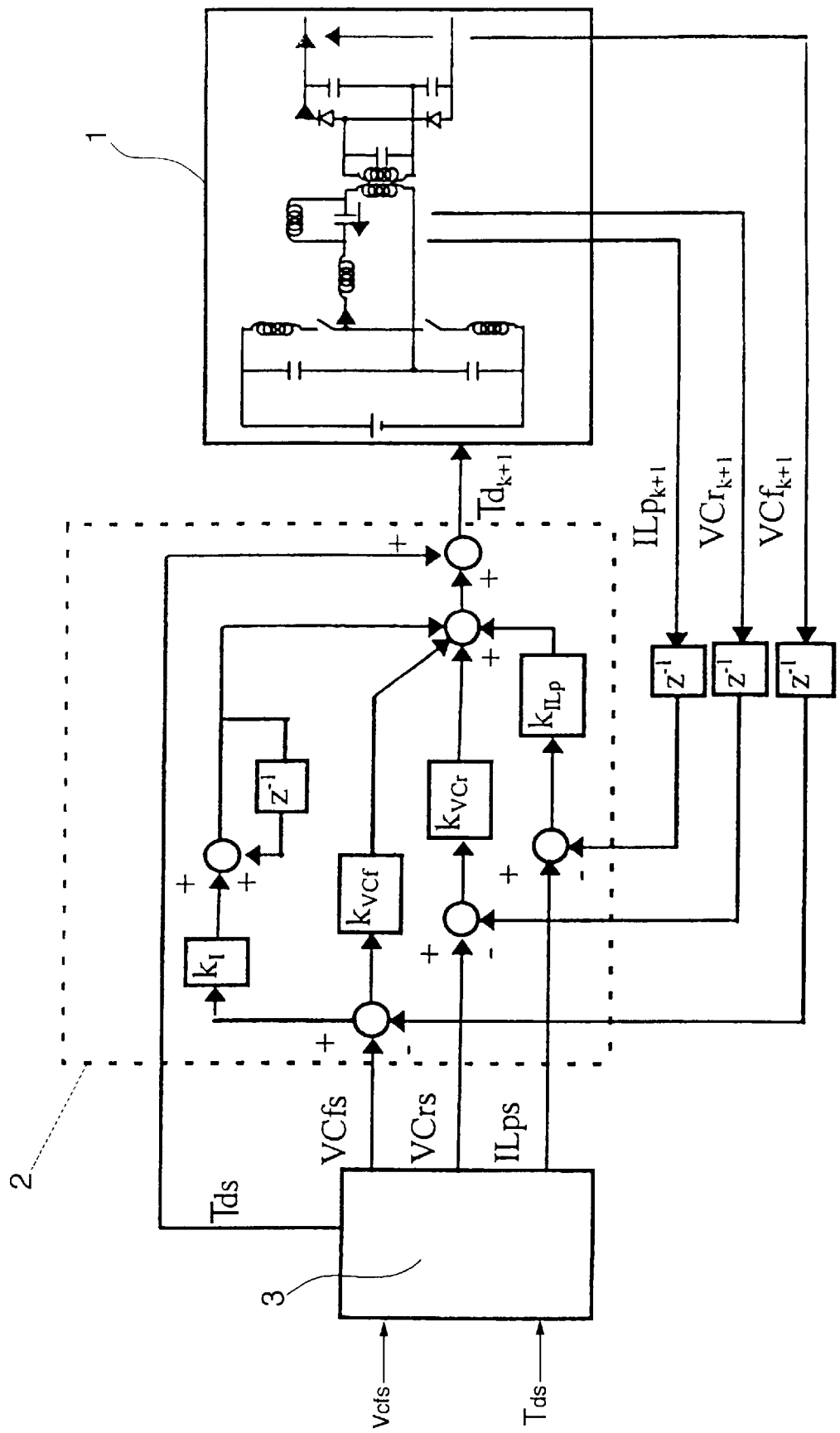
FIG. 8 is a schematic diagram of the regulating device according to the invention.

The value of the activation delay for a given half-cycle is therefore calculated from the following formula:

$$(td_k - tds) = (k_{VCr} \quad k_{ILp} \quad k_{VCf}) \cdot \begin{pmatrix} VCrs - VCr_k \\ ILps - ILp_k \\ VCfs - VCf_k \end{pmatrix}$$

in which the dynamic response of the system in closed loop depends on the choice of the gains $k_{vcr}$, $k_{I1p}$ and $k_{vcf}$. These gains may be calculated using the Ackermann method, starting with the gains of the transfer function. Tables of values of these gains may be stored in memory for various values of current and voltage, to be extracted later during the operation of the converter, illustrated in FIG. 8.

The values of the three state variables $I_{1p}$, $V_{cr}$ and $V_{cf}$ are extracted from the power part 1 of the converter at the sampling instants. These values are relayed, via delay cells, to comparators forming part of a digital processing unit 2. The other input of the comparators is connected to a circuit 3 for developing reference values $V_{cfs}$, $V_{crs}$ and $I_{1ps}$.

The circuit 3 develops the aforementioned reference values on the basis of the voltage $V_{cfs}$ and the desired activation delay $T_{ds}$. At the output of the comparators, the quantities $\Delta I_{1pk}$, $\Delta V_{crk}$ and $\Delta V_{cfk}$ are assigned their respective gain coefficients then added. The quantity $\Delta V_{cfk}$, assigned a gain coefficient $k_1$, is delivered to an integrator circuit in order to provide the regulation with an integral term and ensure the priority afforded to the regulation of the $V_{cf}$. The output of the said integrator circuit is also connected to the circuit which adds the other quantities. The output of the adder circuit is connected to another adder circuit which receives the value of $T_d$, from the circuit 3. The activation delay $T_{dk+1}$ for the next half-cycle is obtained at the output of this other adder circuit and is delivered to a circuit (not shown) for controlling the transistors of the power part 1.

By virtue of the invention, the regulation of the converter is improved considerably while reducing the rise time of the output voltage and the ripple in steady state. Depending on the gain coefficients which are chosen, it is, for example, possible to allow for an exponential growth in the voltage at the start of a voltage rise ramp, in order to profit from a high current at low voltage, which, in the case of an X-ray tube, makes it possible to reduce the doses received by the patient, and also at the end of a voltage rise ramp in order to avoid excessive ripples in the current. Of course, the invention can be applied to extremely wide-spread types of converters intended for supplying different kinds of electrical loads.

Various modifications in structure and/or function and/or steps may be made by one skilled in the art to the disclosed embodiments without departing from the scope and extent of the invention.

What is claimed is:

1. A method for regulating a converter having transistors, in which the value of a number $N_1$ of state variables is measured and stored, then action is carried out on a number $N_2$ of control variables, wherein, $N_1$ being greater than $N_2$, the value of the control variables is calculated, at a given instant, for a number P of periods such that the product of $N_2$ multiplied by P is greater than or equal to $N_1$.

2. The method according to claim 1, wherein $N_2$ is equal to unity and in that the control variable is a time variable.

3. The method according to claim 1 wherein regulation is of the proportional-integral type for one of the state variables and of the proportional type for the other state variables.

4. The method according to claim 2 wherein regulation is of the proportional-integral type for one of the state variables and of the proportional type for the other state variables.

5. The method according to claim 1 wherein the state variables are measured each time one of the state variables reaches a predetermined threshold value.

6. The method according to claim 5, wherein the state variables are measured each time one of the state variables reaches a zero value.

7. The method according to claim 1 wherein the state variables are the current $I_{1r}$ in a series filtering inductor, the current $I_{1r}$ in a parallel filtering inductor, the voltage $V_{cr}$ across the terminals of a filtering capacitor, and the output voltage $V_{cf}$ of the converter.

8. An apparatus for regulating an energy conversion assembly, comprising means for discretely measuring the values of a number $N_1$ of state variables, and means for controlling a number $N_2$ of control variables, with the aim of obtaining, at the output of the control assembly, an optimum time variation of one or more of the state variables, it being possible for the variation of the energy conversion assembly over a period between two measuring instants to be estimated by knowing the state variables at the first measuring instant and the control variables during the period in question, comprising means for developing the values of the $N_2$ control variables over a number P of measuring instants, $N_1$ being greater than $N_2$, with P such that the product of $N_2$ multiplied by P is greater than or equal to $N_1$.

9. The apparatus according to claim 8, wherein $N_2$ is equal to unity and in that the control variable is a time variable.

10. The apparatus according to claim 7, wherein the regulation is of the proportional-integral type for one of the state variables and of the proportional type for the other state variables.

11. The apparatus according to claim 8, wherein the regulation is of the proportional-integral type for one of the state variables and of the proportional type for the other state variables.

12. The apparatus according to claim 1 comprising means for measuring state variables each time one of the state variables reaches a predetermined threshold value.

13. The apparatus according to claim 12 comprising means for measuring state variables each time one of the state variables reaches a zero value.

14. The apparatus according to claim 1 wherein the state variables are the current $I_{1r}$ in a series filtering inductor, the current $I_{1p}$ in a parallel filtering inductor, the voltage $V_{cr}$ across the terminals of a filtering capacitor, and the output voltage $V_{cf}$ of the converter.

* * * * *

UNITED STATES PATENT AND TRADEMARK OFFICE
CERTIFICATE OF CORRECTION

PATENT NO.    : 6,215,675 B1
DATED         : April 10, 2001
INVENTOR(S)   : Jacques Laeuffer and Thierry Planas It is certified that error appears in the above-identified patent and that said Letters Patent is hereby corrected as shown below:

<u>Title page,</u>
Item [54], "METHOD APPARATUS FOR ENERGY CONVERSION" is amended to read:
-- [54] METHOD AND APPARATUS FOR ENERGY CONVERSION --

After the inventors and before the [*] Notice, add:
-- [73] Assignee:  GE Medical Systems, S.A., Buc, France (FR) --

After "[22] Filed: Sep.8, 1998" and before Foreign Application Priority, add:
-- (Under 37 CFR 1.47) --

Signed and Sealed this

Fourteenth Day of October, 2003

JAMES E. ROGAN
*Director of the United States Patent and Trademark Office*